United States Patent [19]
Fuller

[11] Patent Number: 5,352,502
[45] Date of Patent: Oct. 4, 1994

[54] FOLDABLE FREEZE GEL WRAP

[76] Inventor: Sheila P. Fuller, 15850 Swain St., Sylmar, Calif. 91342

[21] Appl. No.: 27,101
[22] Filed: Mar. 5, 1993
[51] Int. Cl.5 .................................................. B32B 1/00
[52] U.S. Cl. ..................... 428/172; 428/178; 428/167
[58] Field of Search ............... 928/178, 174, 167, 156, 928/172, 155, 188, 76, 913; 128/399, 402, 403; 62/529, 530

[56] References Cited

U.S. PATENT DOCUMENTS

| | | | |
|---|---|---|---|
| H759 | 4/1990 | Jones | 128/402 |
| 5,065,758 | 11/1991 | Whitehead et al. | 128/402 |
| 5,167,999 | 12/1992 | Wang | 428/178 |

Primary Examiner—Donald J. Loney
Attorney, Agent, or Firm—Roger A. Marrs

[57] ABSTRACT

A foldable or flexible wrap is disclosed herein having a pair of plastic-like sheets selectively joined together at critical locations so as to provide fold lines or paths subject to flexure whereby the wrap may be wound about an article intended to be maintained in a cool environment. One sheet of the pair is flat while the other is provided with a plurality of spaced-apart pockets containing a freezable gel or substance, such as water. The pockets are arranged in a defined pattern adjacent to the fold lines or paths so that the wrap may take many different configurations when folded about articles of different shapes and sizes.

1 Claim, 1 Drawing Sheet

FOLDABLE FREEZE GEL WRAP

BACKGROUND OF THE INVENTION

1. Field of the Invention

The present invention relates to the field of reusable refrigerant packs, and more particularly to a novel refrigerant wrap that may be readily wrapped or folded about a variety of articles having different shapes and sizes.

2 Brief Description of the Prior Art

In the past, it has been the conventional practice to provide refrigerated packs that are initially placed into a freezer so that the refrigerant substance is hardened and frozen followed by placing the pack into an insulated carrier adjacent to products intended to be kept chilled or cooled. In this connection, it is difficult to wrap or place the pack about the entire exterior surface of the product intended to be chilled since most packs cannot be readily folded or deployed about the product. Also, the theory of conventional refrigerant packs involves cooling the interior environment of an insulated bag or container in order to chill the product and therefore folding or wrapping the product does not represent a consideration. In other instances, refrigerant packs have included insulating layers so as to prevent moisture from gathering and to prolong the life of the refrigerant pack. In other instances, the refrigerant pack will not fit into any container whether it is insulated or not and will not conform to any shape of product intended to be chilled. Although the refrigerant may be placed in spaced compartments along the pack, the separating segments between compartments seldom flex or provide a fold line which will permit the pack to be readily wrapped about the special contour of an irregular product.

Additionally, because of the construction involved in the aforementioned concepts, the manufacturing process is expensive, time-consuming and is limited to a few specific situations.

Therefore, a long-standing need has existed to provide a novel freezable wrap which contains a plurality of pockets filled with refrigerant in such a manner that the pockets may be folded over upon themselves along diagonal, horizontal or vertical fold lines so that the wrap will adapt to any special shape of product intended to be chilled.

SUMMARY OF THE INVENTION

Accordingly, the above problems and difficulties are overcome by the present invention which provides for a foldable wrap having a pair of sheets, such as fabricated from thermal plastic materials wherein one sheet is a base and the other is provided with a plurality of spaced-apart pockets. An area between adjacent ones of the pockets is secured to the supporting sheet which also closes each pocket so as to retain a refrigerant therein, and the regions connecting the plurality of pockets constitute a fold line or path about which the sheets can be folded during the wrapping of a product intended to be chilled. The support or base sheet engages with the exterior surface of the product intended to be chilled during the wrapping or folding procedure and the wrapped product or article is then placed into an insulative bag wherein a storage compartment is occupied thereby.

Therefore, it is among the primary objects of the present invention to provide a novel folding freezable wrap which may be manufactured in accordance with economic procedures and that may be readily installed by persons not having special skills.

Another object of the present invention is to provide a novel foldable refrigerant wrap that can fold about a plurality of hinge axes such that the wrap can accommodate a variety of shapes of products intended to be chilled.

Still another object of the present invention is to provide a novel foldable refrigerant pack or wrap which will engage interior or exterior surfaces of curved contour such that the wrap accommodates a variety of shaped products or articles.

Still a further object of the present invention is to provide a novel refrigerant wrap that may be folded about hinge axes or fold lines whereby separate and individual refrigerant cells or pockets will not interfere with each other during the folding or storage procedure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
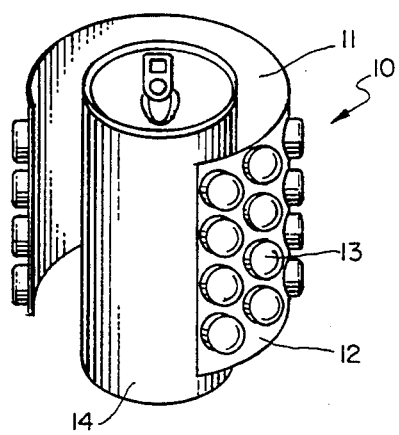
FIG. 1 is a front perspective view of the novel refrigerant wrap illustrated in a semi-folded condition preparatory for placement about an article to be chilled.

Referring to FIG. 1, the novel foldable refrigerant wrap of the present invention is indicated in the general direction of arrow 10 which includes a first sheet of material 11 that may be referred to as an inner or support sheet and a second sheet 12 which is engaged with the first sheet and which is provided with a plurality of pockets or separate and individual compartments such as indicated by the numeral 13. The base sheet 11 serves to seal the compartment or pocket in the second sheet 12 so that a refrigerant product or compound will be contained therein.

The first and second sheets 11 and 12 may be composed of a synthetic polymer composition material, preferably a material which is flexible at freezing temperatures and will contain a refrigerant such as a freezing gel, water or the like. Furthermore, a thermo-plastic material is preferred so that it can be heat sealed between compartments or pockets in order to establish fold or hinge lines whereby the assembled wrap can be placed around articles of different shapes and sizes. For example, in FIG. 1, the wrap 10 is being illustrated preparatory for wrapping around the exterior surface of a cylindrical can identified by the numeral 14. However, it is to be understood that other configurations and forms may utilize the foldable wrap of the present invention such that the wrap may be placed against the inner surface of a bowl or the like as well as in other shaped configurations.

Figure 2:
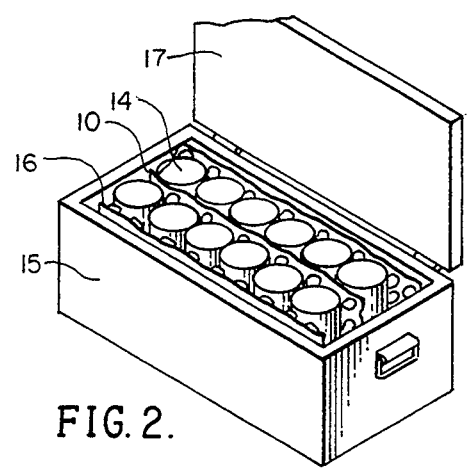
FIG. 2 is a front perspective view showing a plurality of articles intended to be chilled having the inventive wrap of the present invention placed thereabout and where the plurality of articles are placed into an insulative container for transportation.

Referring now in detail to FIG. 2, it can be seen that a container 15 may be employed for holding a plurality of wrapped containers within an interior storage compartment 16. Preferably, the container 15 will be composed of an insulation material so that the temperature environment of the compartment 16 will be maintained chilled as long as possible. A lid 17 may be employed for enclosing the compartment 16 after the containers 14 have been placed therein. It is to be understood that each container 14 may be wrapped with the wrap 10 of the present invention or the invention may take the form of an elongated sheet which is trained about a plurality of containers 14 as illustrated.

Figure 3:
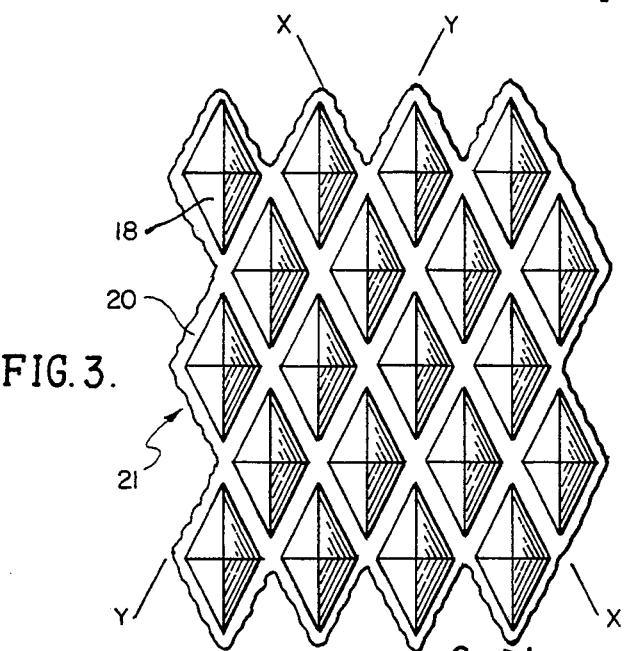
FIG. 3 is a top plan view of a refrigerant foldable pack of the present invention.
Figure 4:
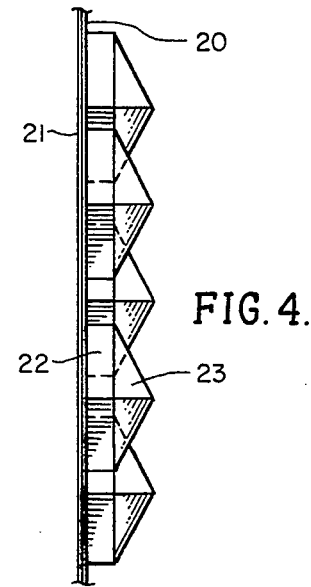
FIG. 4 is a side elevational view of the embodiment shown in FIG. 3.

Referring now in detail to FIG. 3, another configuration of pocket or compartment is illustrated wherein numeral 18 illustrates a diamond shaped pocket rather than the circular pocket 13 shown in FIG. 1. By arranging the diamond shaped pockets on the sheet 20, hinge axis lines X—X and Y—Y are presented that represent fold lines so that the wrap indicated by numeral 21 may be placed around objects intended to be chilled which are of odd or irregular shape or size. FIG. 4 indicates that sheet 20 is heat sealed onto the base or support sheet 21 in a similar fashion as shown and described with respect to sheets 11 and 12 of wrap 10. Also, in this view, it can be seen that each pocket or compartment includes a reduced sidewall 22 which supports a pyramid shape 23 of the pocket, compartment or cell.

Figure 5:
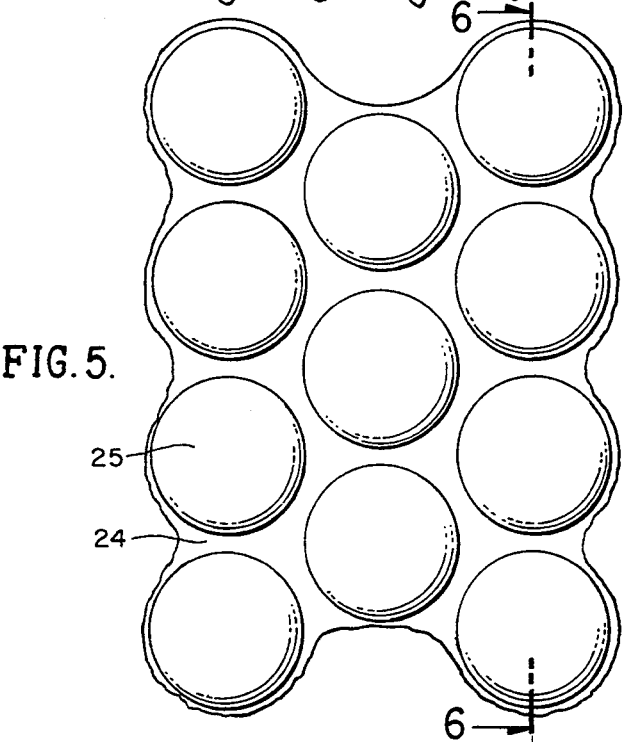
FIG. 5 is a top plan view of another embodiment of foldable refrigerant wrap incorporating the invention.
Figure 6:
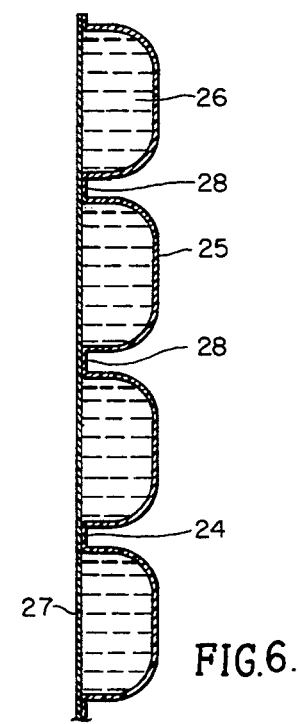
FIG. 6 is a transverse cross-sectional view of the refrigerant wrap shown in FIG. 5 as taken in direction of arrows 6—6 thereof.

Referring now in detail to FIGS. 5 and 6, another embodiment of the invention is illustrated wherein the sheet 24 is provided with a plurality of circular cells or compartments as identified by numeral 25, which are similar to the pockets 13 carried on sheet 12. However, it is to be understood that the arrangement of the compartments or pockets is critical so that the distance between separate and individual pockets permits folding of the sheets during the installation of the wrap about an article intended to be chilled. In this configuration, a substantial number of fold lines or areas are provided so that the wrap may follow a torturous path about the object against which it is wrapped. In FIG. 6, it can be seen that the interior of each pocket or compartment is filled with a refrigerant such as identified by numeral 26, that may take the form of a freezing gel introduced into the compartment before the compartments are completely sealed. After filling, the sheet is placed into a refrigerator or freezer so that it is chilled or frozen, as desired by the user. The refrigerant or gel is preferably a material which changes state at 30 to 40 degrees F. and requires considerable heat energy as it warms through this change of state so that it serves as an artificial ice or serves as a medium which absorbs heat from its surroundings to maintain its surroundings at a lower temperature level than would otherwise be available. Such gels or refrigerants are conventional and are well known. Some of them are solid in the chilled state and some are pliable. A pliable freezing gel is preferable for use in connection with the wrap of the present invention. When filled with the freezing gel, the pockets or compartments are sufficiently occupied by the gel so that even in the warm state, each of the compartments or pockets serves as a structural member which is sufficiently stiff that it will add body to the wrap.

FIG. 6, as well as the other embodiments, illustrate that the base sheet 27 is secured to the second sheet 24 by means of a plurality of heat-sealed spots, such as indicated by numeral 28 in FIG. 6. It is to be understood that the heat-sealing process extends along the entire engagement of sheets 24 and 27 between the individual and separate pockets or compartments. Therefore, the wrap may be readily folded, manipulated or bent about these fold areas to accommodate any particular shaped container or item intended to be chilled.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A foldable freeze wrap comprising:

a first support sheet of material;

a second compartmented sheet of material attached to said support sheet and having a plurality of individual and separate pockets;

said pockets arranged in spaced-apart relationship and each of said pockets enclosing a freezable product which totally occupies the interior of each of said pockets;

selected fold areas of said sheets specifically defined as being between said pockets joined together by a heat seal attachment and said selected fold areas constituting fold lines about a linear hinge axis so that said sheets are foldable over to accommodate wrapping about an article to be chilled;

said freezable product is a gel and said sheets are composed of a freezable material whereby both gel and sheets may be frozen prior to wrapping about the article to be chilled;

said wrap being foldable in its frozen condition and adapted to assume the shape of the article intended to be chilled;

each of said gel occupied pockets are configured in the shape of a diamond in plan view and a pyramid in side elegational view;

said selected fold areas include hinge axis crossing along X—X and Y—Y axis between adjacent ones of said separate and individual diamond shaped pockets.

* * * * *